United States Patent [19]

Schrader

[11] Patent Number: 4,609,036
[45] Date of Patent: Sep. 2, 1986

[54] BULK HEAT OR COLD STORAGE DEVICE FOR THERMAL ENERGY STORAGE COMPOUNDS

[75] Inventor: Marguerite D. Schrader, Midland, Mich.

[73] Assignee: The Dow Chemical Company, Midland, Mich.

[21] Appl. No.: 763,364

[22] Filed: Aug. 7, 1985

[51] Int. Cl.$^4$ .............................................. F28D 21/00
[52] U.S. Cl. .................. 165/10; 165/104.11; 126/430
[58] Field of Search .............................. 165/10, 104.11; 126/430

[56] References Cited

U.S. PATENT DOCUMENTS

| | | | |
|---|---|---|---|
| 2,936,741 | 5/1960 | Telbes | 165/10 |
| 4,341,262 | 7/1982 | Alspaugh | 165/10 |
| 4,403,645 | 9/1983 | MacCracken | 165/10 |

FOREIGN PATENT DOCUMENTS

| | | | |
|---|---|---|---|
| 3142525 | 4/1983 | Fed. Rep. of Germany | 165/10 |
| 2365093 | 4/1978 | France | 165/10 |

*Primary Examiner*—Albert W. Davis, Jr.

[57] ABSTRACT

A bulk thermal energy storage device is provided comprising a bulk storage tank containing a latent energy storage material, preferably a phase change material which is subject to repeated melting and freezing during which latent thermal energy is absorbed or released by the phase change material. A plurality of heat exchange devices are generally vertically positioned within the phase change material and at a predetermined distance from each other and from the walls of the storage tank for flow of a heat exchange fluid serially through said passageways in the heat exchange devices. At least one screen is positioned in the storage tank in a generally horizontal position and extending between the walls of the tank and the heat exchange devices for supporting the phase change material when in a frozen condition during the melting cycle of the phase change material to prevent settling of the phase change material to the bottom of the tank. The predetermined positioning of the heat exchange devices and the screen in the storage tank provide for an optimum heat exchange between the heat exchange devices and the phase change material in the tank and prevent the loss of heat exchange efficiency due to a settling-out of frozen particles of the phase change material to the bottom of the tank.

12 Claims, 3 Drawing Figures

BULK HEAT OR COLD STORAGE DEVICE FOR THERMAL ENERGY STORAGE COMPOUNDS

BACKGROUND OF THE INVENTION

The present invention resides in a bulk thermal energy storage device. More particularly, the invention resides in a bulk thermal energy storage device comprising a container or tank for storing a hydrated phase change material (PCM) which is subject to repeated freezing and melting cycles during which latent thermal energy in the composition is released or, alternatively, thermal energy is absorbed by the composition. At least one heat exchange device is positioned within the PCM inside of the bulk container in a substantially vertical position. The heat exchange device has a flow passage or channel therein for flow of a heat exchange fluid through the channel. The heat exchange device is positioned in the container in a spaced relationship to the interior walls of the container to permit convection currents to flow through the spaces provided between the interior wall surfaces off the bulk container and the exterior wall surfaces of the heat exchange device during the melting cycle of the PCM. At least one screen is positioned in the bulk container extending substantially horizontally and at a distance from the bottom of the container and adjacent to the heat exchange device for supporting solid crystalline particles of the PCM which are present at the onset of the melting cycle of the PCM. The supporting screen prevents any solid crystalline particles from settling or falling to the bottom of the container, during the onset of the melting cycle, where the crystalline particles are no longer sufficiently exposed to a direct contact with the convection currents of the melted PCM to melt such solid crystalline particles. The screen supports the solid particles in a position adjacent to the heat exchange device and above the container bottom such that the convection currents of the molten PCM can contact the solid particles until the solid particles have absorbed sufficient thermal energy from the molten PCM to undergo a phase change from a solid to a molten state.

DESCRIPTION OF THE PRIOR ART

Thermal energy storage materials are well known in the art and include phase change materials capable of storing latent thermal energy by means of a reversible change of state, or phase change, in the storage material. Latent heat materials have the advantage of higher heat storage capacity, thus allowing a reduction in size and weight in the thermal storage unit; lower storage temperature; less insulation, and higher collection efficiency.

Phase change materials which may be employed in the practice of the present invention are various hydrated salt compositions such as are well known in the art. A number of such PCM's have been identified by G. A. Lane in Volume 1 of "Solar Heat Storage: Latent Heat Materials", published 1983, CRC Press, Boca Raton, Fla.

Of particular interest are thermal energy storage materials which have phase transition temperatures in the range of from greater than about zero degrees up to about 140° C. Included within this temperature range is the material $CaCl_2.6H_2O$, which is of particular interest because of its low cost; ready availability for large scale domestic and commercial installations; applicability to a large number of end uses, and low toxicity.

Preferred phase change compositions comprise a mixture of hydrated $CaCl_2$ with other salts, to modify the semi-congruent melting behavior of the hydrated $CaCl_2$ to a congruently melting composition. Such preferred compositions are disclosed, for example, in U.S. Pat. Nos. 4,272,390, and 4,412,931; U.S. application Ser. No. 364,159 filed Mar. 31, 1982; U.S. application Ser. No. 504,763, filed June 15, 1983, and U.S. application Ser. No. 540,726 filed Oct. 11, 1983, all of which are incorporated herein by reference.

The storage of phase change materials has also been extensively investigated in past years since containers for PCM's must be able to withstand the physical stresses accompanying the freeze-thaw cycles of the PCM over a long period of time. Reference is made to report ORO/5217-8 of November, 1978 entitled "Macro Encapsulation of Phase Change Materials," authored by G. A. Lane et al. The study showed that containers for hydrated PCM's must be constructed of a durable material and must be reliably leak-proof to liquids and vapors. Since PCM's are generally corrosive, the containers must also be constructed of a material which is resistant to such corrosion.

Containers made of stainless steel or other corrosion resistant metals or alloys have shown themselves to be effective over long periods of time. Although the cost of metal containers of a small size such as are normally employed in residential housing is prohibitive, such containers are cost effective when employed as large bulk storage containers for use in large commercial installations such as, for example, office buildings, cold storage buildings, and the like. A large thermal energy storage system employing a PCM for an off-peak air-conditioning system is described in a report by James C. Dudley under the designation NSF/RANN/SE/-GI27976/TR72/8. The report is entitled "Thermal Energy Storage Unit for Air Conditioning Systems Using Phase Change Materials", and was supported by the National Science Foundation Grant No. GI27976. In this report, J. C. Dudley describes a unit sized for a two ton peak load and a one ton daily average load. The unit had a rated capacity of 100,000 BTU. The heat transfer surface was a stack of 42 horizontally positioned aluminum sheets, spaced one inch apart, with embedded refrigerant passages. The unit was designed for use in air conditioning and coolness storage systems or in space heating storage systems with suitable choices of phase change materials.

The drawback in large systems such as described by J. C. Dudley is that the heat exchanger sheets are stacked horizontally with a uniform one inch spacing between adjacent sheets. Such arrangement does not allow for a uniform distribution of the thermal energy being transfered to or withdrawn from the phase change composition. Moreover, very little convection current flow can take place between the horizontally spaced heat exhanger sheets thus retarding or preventing a melting of the phase change material between the stacked sheets.

Generally, a maximum thermal energy exchange takes place between the heat exchanger sheets and the phase change material in the upstream sheets i.e. the sheets nearest the inlet for the heat exchange fluid flowing through the sheets. A relatively reduced thermal energy exchange takes place between the sheets and the phase change material at the downstream end, i.e. nearest the outlet end of the system. It will be apparent that the phase change of a PCM from a frozen to a molten state (for cooling purposes, i.e., air-conditioning or refrigeration) will take place more rapidly nearer the inlet to the first, in line, heat exchange sheets where the thermal energy input is at its highest, whereas the thermal energy transfer in the heat exchange sheets nearest the outlet is at a minimum.

SUMMARY OF THE INVENTION

The problems associated with storage devices of the prior art have now been overcome with the bulk thermal energy storage device of the present invention.

A particular object of the invention resides in a thermal energy storage device comprising a container for storing a phase change material and a plurality of plate-like heat exchange devices positioned within the container in a substantially vertical orientation and spaced at a predetermined distance from each other and from the container walls.

A further object of the invention resides in a thermal energy storage device comprising a container for storing a phase change material, a plurality of plate-like heat exchange devices positioned within the PCM and inside of the container in a substantially vertical orientation, and at least one screen in said container extending substantially horizontally and at a distance from the bottom of the container and adjacent to the heat exchange devices for supporting solid crystalline particles of the PCM during the melting cycle of the PCM.

Advantages of the storage device of the invention are that the tank is of a size to hold a large quantity of a PCM, i.e. in excess of 100 gal., and constructed of a material of sufficient strength e.g. ⅜ inch carbon steel plate, to allow filling and sealing of the tank before shipment of the storage device to the site of installation.

A further advantage of the storage device of the invention is that the tank is hermetically sealed to prevent the loss of water vapor and therefore a change in the amount of hydration of the PCM. Hermetic sealing of the tank also prevents internal corrosion of the tank components by excluding oxygen.

Another advantage of the storage device of the invention resides in the substantially vertical orientation of the heat transfer or heat exchange plates within the tank which allows for a convection current flow of the molten PCM during the melting cycle of the PCM.

An advantage of the invention also resides in the predetermined variable spacing of the plates from each other and from the tank walls to allow for a maximum or optimum energy transfer between the plates and the phase change material.

The size of the storage device of the invention is preferably designed within limits to allow for ease of movement of the device into a building and for ease of installation, servicing or remodeling.

The storage device of the invention can be sized for any desired cycling interval. Preferably, and depending on the ultimate use of the device, the cycling time is for a 24 hour period during which the PCM undergoes a phase transition from a molten to a frozen state and back again from a frozen to a molten state.

More specifically, the present invention resides in a storage device comprising a container having a bottom wall, a top wall, and at least one side wall, a hydrated phase change material contained in said container and capable of absorbing latent heat energy during the melting cycle of the material and which is capable of releasing latent heat energy during the freezing cycle of the material, a plurality of generally planar heat transfer device positioned in said container in a substantially vertical orientation, said heat transfer devices being connected to each other in series and spaced in a predetermined variable relationship with respect to each other and the side wall of the container, for flow of a heat exchange fluid through said heat and transfer devices, and a screen positioned in a substantially horizontal position in said container, said screen being arranged in a spaced position above the bottom of the container.

The present invention also resides in a storage device comprising a container having a top wall, a bottom wall, and opposed side walls, a hydrated phase change material contained within the container, wherein said phase change material passes through repeated cycles of melting and freezing during which the phase change material absorbs and releases latent heat energy, a plurality of heat transfer devices positioned in said container in a substantially vertical orientation, each heat transfer device having a plate-like shape with an internal passageway for flow therethrough of said heat exchange fluid, an inlet conduit for said heat exchange fluid connected to an inlet of said passageway in a first of said series of heat transfer devices, an outlet conduit for said heat exchange fluid connected to an outlet of said passageway in the last of said series of heat transfer devices, and connecting conduits for serially connecting the passageways of the heat transfer devices to each other, and wherein the first heat transfer device is spaced from its adjacent container wall and from a succeeding heat transfer device in said series by a distance which is greater than the distances of the intermediate heat transfer device from each other and which is also greater than the distance of the last heat transfer device from its adjacent container wall and from a preceding heat transfer device of said series, and a screen positioned in said container in a substantially horizontal position above the bottom wall of the container and adjacent to the heat transfer device for supporting solid crystalline particles of the phase change material which are present during the melting of the phase change material.

The invention additionally resides in a method of storing energy in a container containing a hydrated phase change material, comprising the steps of positioning a plurality of generally planar heat transfer devices in a substantially vertical and submerged position into said phase change material in said container such that a first of said series of heat transfer devices is more widely spaced from an adjacent side wall of said container and from an adjacent intermediate heat transfer device than the spacing of a last of said series of heat transfer devices from an adjacent side wall of said container and said adjacent intermediate heat transfer device, positioning at least one screen in said container in a substantially horizontal and spaced position above a bottom wall of the container and adjacent to the heat transfer devices, hermetically sealing said container, and flowing a heat exchange fluid serially through said heat transfer devices for melting or freezing said phase change material and for absorbing and releasing latent heat energy from said phase change material.

BRIEF DESCRIPTION OF THE DRAWINGS

Having generally described the invention herein above, reference will now be made to the accompanying drawings for a more detailed description of the invention. A preferred embodiment of the invention is illustrated in the attached drawings in which.

DETAILED DESCRIPTION OF THE INVENTION

Figure 3:
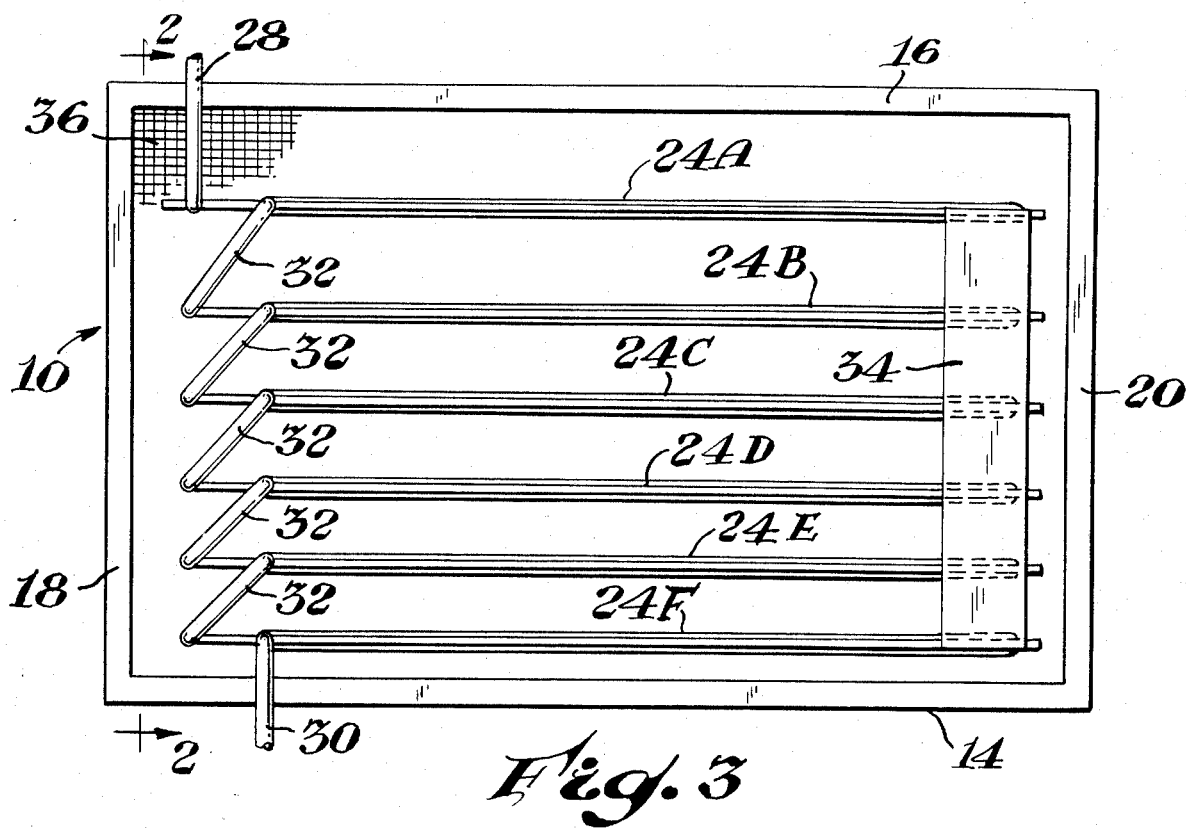
FIG. 3 is a top view, in cross-section, of the storage device of FIG. 1, but showing, in particular, the inlet, outlet and connecting conduits connecting the heat exchange devices the horizontally extending screen, and the predetermined spacing between the plates.
Figure 1:
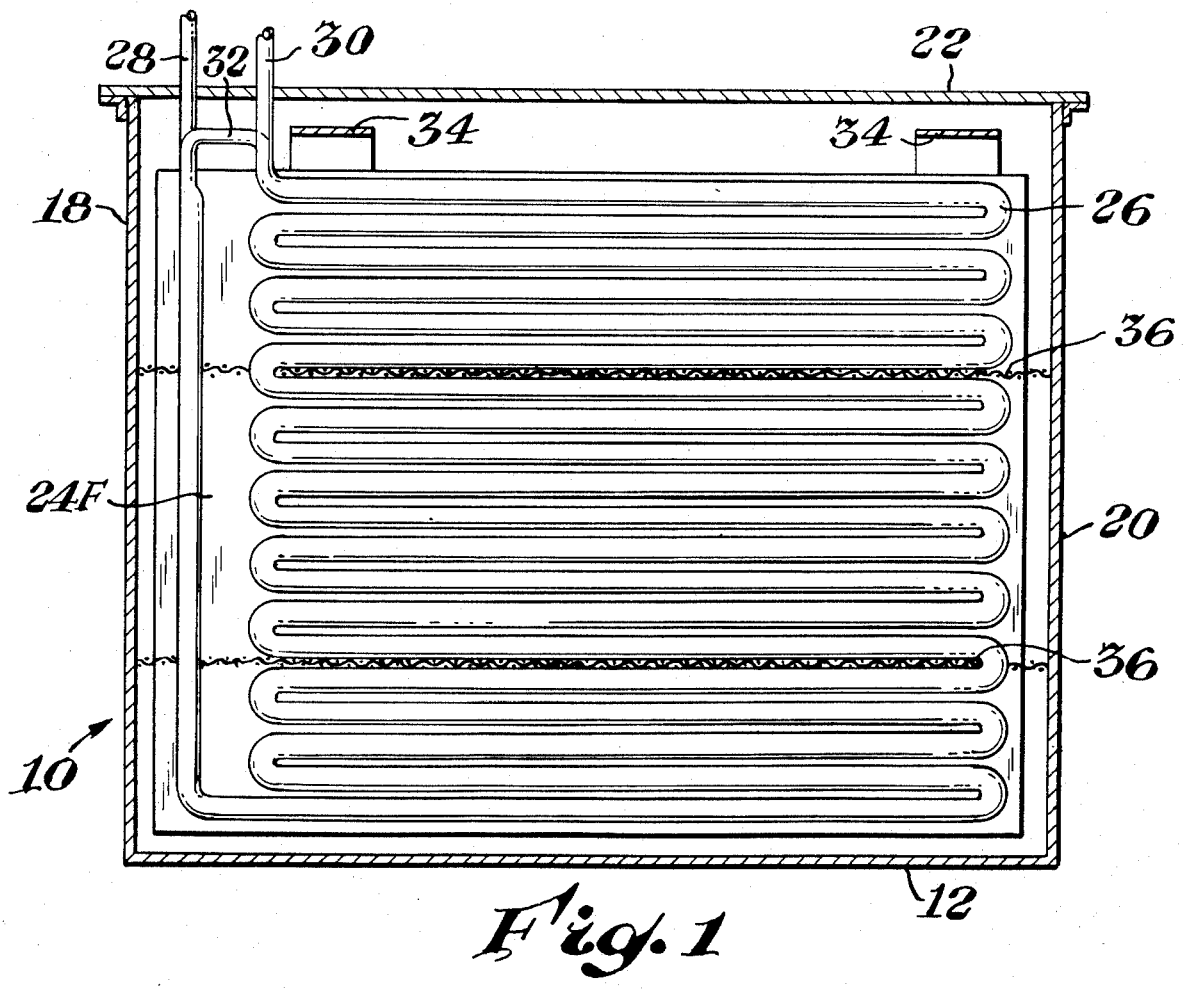
FIG. 1 is a planar side view, in crosssection, of a bulk thermal energy storage device comprising a bulk storage tank or container having a heat exchange device positioned in the container.

With particular reference to the drawings, there is illustrated a bulk thermal energy storage device comprising a bulk storage tank or container (10). The storage tank can be constructed of any suitable material provided that the tank has sufficient strength to contain a relatively large quantity of a reversible liquid/solid phase change material (PCM) over a long period of time. Materials such as metals, metal alloys, metal/plastic/metal laminates, synthetic resinous materials, plastic lined concrete, for example, may be suitably employed in the construction of the storage tank. Metals or metal alloys are preferred, particularly those metals or metal alloys, which are resistant to corrosion such as stainless steel, or carbon steel and the like. The term bulk storage tank herein signifies tanks which contain PCMs in amounts generally greater than about 100 gallons. Tanks having a capacity of less than about 100 gallons are not economically attractive particularly when constructed of a metal or metal alloy. Storage tanks under consideration here have a capacity of about 100 gallons and up to 20,000 gallons, or greater.

The storage tank (10) preferably is rectangular in shape and comprises a bottom wall (12), a front wall 14, rear wall 16 and opposed side walls 18 and 20. It is apparent that the storage tank may be constructed of other geometric shapes such as of a square, circular or oval shape. The tank is provided with a cover or lid (22) which is preferably made of the same material as the tank and which can be secured to the tank as by welding, bolting, or any other convenient manner. The container should be hermetically sealed to prevent the loss of water from the hydrated PCM. Such loss of water is effectively prevented where the lid is welded to the container. However, it is generally more convenient to secure the lid to the container body by bolting the lid to a flange provided on the open end of the container, in a manner well known, so that the lid can be removed from the container if it should become necessary to inservice the device, i.e. the heat exchange plates, conduit connections, screens, and the like, during the life of the storage device. If the lid is bolted to the container opening, it is necessary to provide a suitable sealing gasket between the container flange and the lid to prevent the escape of water vapor from the container. The sealing gasket may be made of any suitable material, such as are commonly employed in Industry. The tank is filled with a suitably formulated phase change material depending on whether the storage device is intended to be used as a "heat" or as a "cold" storage device. Preferred PCM's which may be usefully employed in the storage device of the invention are those which melt over a broad temperature range and which can be used for (1) the storage of "coolness" over a temperature range of from about 5° to about 17° C.; (2) for the storage of "heat" over a temperature range of from about 25° to about 50° C., and (3) as a buffer or heat sink to moderate diurnal swings in the ambient temperature range of from about 17° to about 25° C.

A plurality of heat exchange devices (24A-24F) are positioned in the tank in a substantially vertical orientation. The devices are submerged in the PCM and are thus in intimate thermal heat exchange contact with the PCM. The heat exchange devices are preferably of the type in which two metal plates or sheets are welded together along their outer edges and along a pair of spaced, serpentine, pathways. The space between the welds is subsequently inflated under high fluid pressure to form a serpentine or convoluted passageway or conduit (26). Alternatively, two metal plates can be stamped prior to welding to provide a serpentine passageway between the plates. Such heat exchange plates generally provide for a somewhat better heat transfer due to absence of dead spaces in the welded plates. Moreover, such prestamped and welded plates are better able to withstand internal pressures of a heat exchange fluid and stresses due to expansionary and contractionary forces on the metal plates brought about by the melting and freezing cycles of the phase change material.

An inlet conduit (28) for a liquid or gaseous heat exchange medium is welded to one end of the passageway (26) which terminates in an opening (not shown) at an edge of the heat exchange plate. An outlet conduit (30) for the heat exchange medium is welded to the other end of the passagway (26) which terminates in an opening (not shown) at an edge of the heat exchange plate. Preferably, the inlet and outlet of the passageway terminate at the same edge of the heat exchange plate so that the inlet and outlet conduits (28,30) can be conveniently connected to the plate by passing the conduits through the openings in the lid as is more clearly shown in the drawings. The inlet and outlet conduits are subsequently sealed to the lid by means of sealing washers, or the like, to prevent the loss of water vapor through the space between the openings in the lid and the inlet and outlet conduits. The heat exchange plates of the aforedescribed construction are preferred since they have great structural strength, superior heat exchange transfer capacity which extends beyond the passageway (26) into the welded portions of the plates, and are economical to manufacture. It will be apparent, of course, that an effective heat exchange transfer may also be affected with a tube bundle constructed of a plurality of individual tubes such as is conventionally employed in high-temperature steam heat exchangers.

The heat exchange plates 24A through 24F are interconnected by connecting or bridging conduits (32). Accordingly, the inlet conduit (28) is connected to a first of a series of heat exchange plates (24A) while the outlet conduit (30) is connected to the last of the series of heat exchange plates (24F). The outlet end of the passageway (26) of plate (24A) is connected by means of the connecting conduit (32) to an inlet end of the second heat exchange plate (24B) and so on. Accordingly, the plates (24A) through (24F) are serially connected to each other such that the heat exchange medium can flow from the inlet conduit (28) sequentially through the passageway (26) of each plate and out of the outlet conduit (30) for subsequent utilization of the heat or cold energy from the heat exchange medium. The plates are spaced at a predetermined distance from each other and are conveniently attached as, for example, by welding, to a frame member or a pair of frame members (34) positioned at opposite ends of the plates. The frame members (34) may be provided with lifting hooks or handles (not shown) to allow for a removal of the entire assembly of heat exchange plates from the tank.

Figure 2:
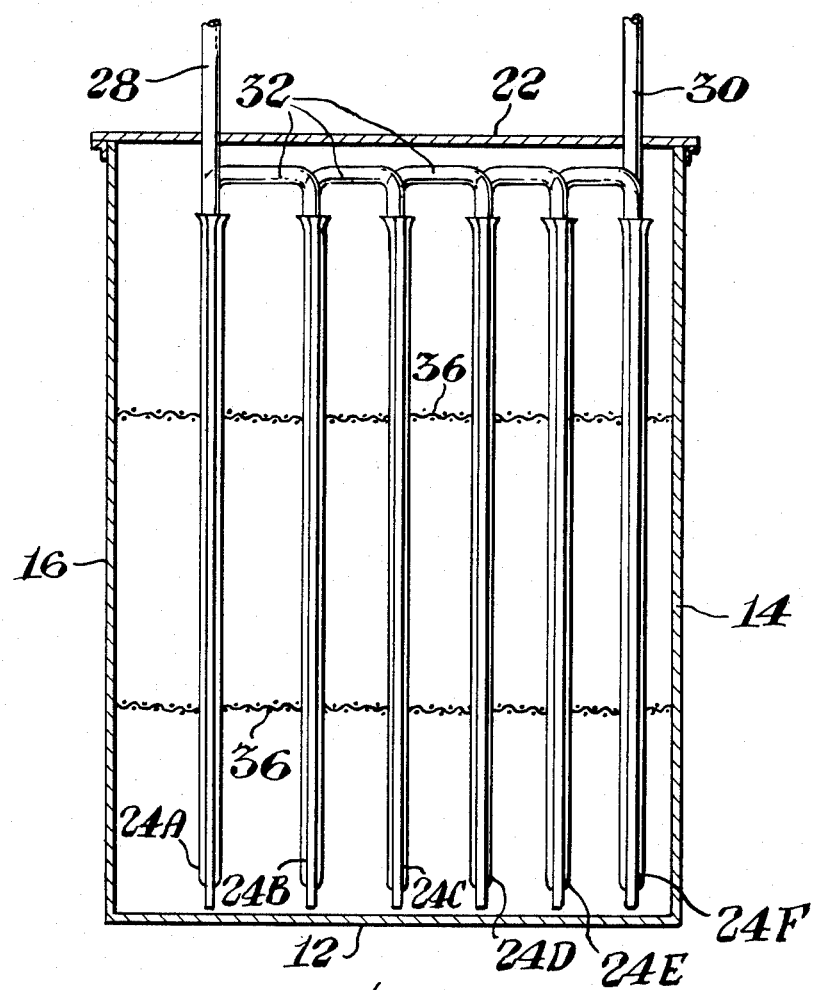
FIG. 2 is a planar front view, in crosssection, of the storage device of FIG. 1 but showing, in particular, a plurality of vertical heat exchange devices positioned in a predetermined, spaced relationship with respect to each other and, with respect to the front and rear walls of the container, and a pair of horizontally spaced screens in the container.

From FIGS. 2 and 3, it will be seen that the plate (24A) is more widely spaced from plate (24B) than is the spacing of plate (24B) from plate (24C) and so on. Stated another way, the spacing between the plates (24A) through (24E) decreases gradually between the plates, with the greatest distance being between the first plates (24A) and (24B) and with the smallest distance being between the last plates (24E) and 24F). The relative spacing between the plates is determined to compensate for a relatively greater heat exchange transfer which takes place between the heat exchange medium entering the passageway (26) of the first plate (24A) at inlet conduit (28) and the relatively lower heat exchange transfer which takes place between the heat exchange medium leaving the passageway (26) of the last plate (24F) at outlet conduit (30). By way of example, if the phase change material in the tank is in a molten state and it is desired to extract the latent heat energy from the PCM for heating purposes, a relatively cool heat exchange medium passing through the passageways in the plates will absorb a greater amount of heat energy from the PCM as it passes through the first plate (24A). Additional heat energy is absorbed by the heat exchange medium in a gradually decreasing amount as it passes through the passageways in each succeeding plate (24B) through (24F). Energy absorption will therefore gradually decline as the heat exchange medium flowing through the plates heats up. By the time that the heat exchange medium leaves heat exchange plate (24F) through conduit (30), it will have absorbed a sufficient amount of thermal energy from the PCM to allow it to be effectively utilized in the subsequent transfer of this thermal energy for heating purposes. Since the greatest amount of energy transfer takes place at plate (24A) it has been found that by properly spacing the plates with respect to each other and with respect to the side walls of the tank, a more effective and a more uniform transfer of energy is achieved between the plates and the PCM in the tank. In effect, the presence of a greater volume of the PCM in the space between the plate 24A and rear wall of the tank and between plates (24A) and 24B) will insure that the PCM will crystallize or freeze at about the same time as the PCM which is present in the space between plates 24F and front wall of the tank and between plates (24E) and (24F) where a relatively smaller transfer of energy between these plates and the PCM takes place. Freezing or crytallization of the PCM therefore takes place uniformly throughout the tank and is advantageously completed at about the same time interval.

In the case where the PCM in the tank is in a crystallized or frozen condition and the heat exchange medium is at a relatively high temperature, the heat exchange medium flowing through the plates will initially melt the PCM crystals that are nearest or adjacent each plate. The molten PCM adjacent to the outer surfaces of each plates will begin to flow along channels between the outer surfaces of the plates and the PCM which is still in a frozen state. the convection current set up by the molten PCM gradually releases monolithic portions of the still frozen PCM midway between the plates. As these frozen portions break up into smaller blocks or particles, they tend to sink or settle to the bottom of the tank where they collect as a sediment of still frozen particles. Since the convection current of molten PCM can no longer circulate as freely over the surfaces of the frozen blocks or particles of the PCM at the bottom of the tank, they remain permanently as an inoperative residual PCM at the bottom of the tank during each succeeding cycle of conversion of the PCM from a frozen to a molten state. This condition effectively reduces the energy storage capacity and efficiency of the system.

To prevent the accumulation of frozen PCM particles at the bottom of the tanks, one or more porous supports or screens (36) are provided in the tank. The screens are positioned in a substantially horizontal position and at a spaced distance from each other and from the bottom of the tank. As particularly shown in FIG. 2, two screens (36) are provided in the tank each extending over the entire area of the tank bounded by the front, rear and side walls and between the heat exchange plates. Advantageously, the bottom screen may be positioned at a distance of about $\frac{1}{3}$ the depth of the PCM from the bottom of the tank. The upper screen may be positioned at a distance of about $\frac{2}{3}$ the depth of the PCM from the bottom of the tank. Accordingly, the screens are substantially equally spaced from each other and from the bottom of the tank. If it is desired to employ more than two screens, it will be apparent that the screens can be arranged so that they are spaced from each other and from the bottom of the tank at substantially equal distances for most effective performance.

The screens are preferably made of a metal wire mesh having a mesh size of from 2.83 mm to about 12.7 mm (U.S. Sieve Series) and are attached to the walls of the tank and/or the plates by any convenient method such as, for example, by tack welding. The screens are preferably constructed of a non-corrosive metal or metal alloy. Other types of screens or porous supports may be employed in the practice of the invention such as, for example, metal plates provided with a multiplicity of drilled or stamped holes. Such metal plates would preferably be provided with openings having a size of about 3 mm to about 12.5 mm in diameter or on the square and an open area of from about 50 to 75 percent of the total area of the sheet. The thickness of the screen is somewhat dependent on the size of the tank; the size of the heat exchange plates, and the number of screens that are employed in the tank.

During the melting cycle of the PCM, blocks or particles of the still frozen PCM which are released from the heat exchange plates are effectively supported and retained on the screen. While they are supported and retained on the screens, convection currents of the molten PCM continues to circulate freely through the screens and over the frozen PCM particles until complete melting of the particles is achieved. Smaller particles dropping through the holes in the screen are held in suspension by the upwardly flowing molten PCM until they are dissolved in the melt. The screens are thus effective in retaining frozen PCM particles in position between the heat exchange plates and the walls of the tank until the convection current of molten PCM causes a complete melting of the particles.

EXAMPLE

A storage tank was constructed from ⅛ inch carbon steel plate having a width of 28 inches; a height of 49 inches and a length of 50 inches. Five heat exchange plates were connected to a frame member and inserted into the tank. Each heat exchange plate consisted of two flat sheets of carbon steel having a height of 36 inches and a length of 47 inches. The sheets are resistance welded to each other to form a seam. The space between the seam was inflated to form a pillow-effect in which the inflated portion had a thickness of 0.4 inch. The inflated portion formed a passageway for a heat exchange fluid. The heat exchange plates are of a type commercially available from Paul Mueller Co. under designation 5D-14/14 C. Steel: 36 in×47 in SW., and are generally identified as temp-plates.

The five plates were inserted into the tank and connected in series so that water entering and flowing through the first plate is discharged and fed to a second plate, the discharge from the second plate is fed to the third plate, etc. The inlet conduit to the first plate and the outlet conduit from the fifth plate were extended through the tank cover and connected to a tempered water loop in which the water temperature varied from 50° F. to 105° F.

The heat exchange plates were spaced in the tank for maximum heat transfer between the PCM and the plates. Plate no. 1 was spaced 3.0 inches from the tank wall; plate no. 2 was spaced 5.4 inches from plate no. 1; plate no. 3 was spaced 4.7 inches from plate no. 2; plate no. 4 was spaced 4.5 inches from plate no. 3; plate no. 5 was spaced 4.3 inches from plate no. 4; and 2.0 inches from the tank wall. All distances are measured from the center of the plates.

A screen having mesh openings of ¼ inch and constructed of nickel was installed at two levels horizontally across the tank. The first screen was installed at a distance of 10 inches from the bottom of the tank and the second screen at a distance of 25 inches from the bottom of the tank. The screens were tack welded to the tank walls and the heat exchange plates. The tank was then filled with 225 gallons of a hydrated $CaCl_2$ PCM and hermetically sealed by bolting a lid to the gasketed tank. The tank was tested for leaks to make sure that the PCM was hermetically sealed within the tank.

Water at a temperature of 55° F. was fed through the inlet conduit connected to the first plate in the tank at a rate of 1000 lb/hr. Exit water temperature varied from 81° F. at the start of the cycle to 61° F. after 12 hours. Approximately 180,000 BTU's of energy was released from the water during the 12 hour interval. The inlet water temperature was raised to 105° F. and water was fed to the unit at the same rate of 1000 lb/hr. The outlet water temperature varied from 81° F. at the start of the cycle to 90° F. at the end of the cycle when all of the PCM in the tank had been melted. The cycle was completed after about eight hours.

The unit was tested over 34 complete cycles (charge-discharge) and 30 partial cycles of charging or discharging. No decline in the energy storage capacity or efficiency of the unit was detected.

The tank/heat exchanger unit of the invention may be employed as a single unit, or several units may be coupled together for greater energy storage capacity. The unit is capable of providing a thermal capacitor or buffer in systems where waste heat is being generated during one time frame, and thermal energy at the same temperature level is required during another time frame. The unit can be designed to perform a complete charge/discharge cycle (melt/freeze) over any desired time period. Usually, one complete melt/freeze cycle is performed over a 24 hour time period.

The tank is designed to be filled and sealed before shipping to a site of installation, thereby allowing for better quality control of the PCM and improved construction of the unit at the manufacturing site.

The unit can be coupled to a water loop, as a heat exchange medium or to a loop of any other heat transfer fluid, liquid or gaseous. Loops to which the unit of the invention can be advantageously employed include water source heat pump loops; commercial air conditioning loops or waste hot water recovery, for example.

What is claimed is:

1. A storage device comprising a container having a bottom wall, a top wall, and at least one side wall, a hydrated phase change material contained in said container and capable of absorbing latent heat energy during the melting cycle of the material and which is capable of releasing latent heat energy during the freezing cycle of the material, a plurality of generally planar heat transfer devices positioned in said container in a substantially vertical orientation, said heat transfer devices being connected to each other in series and spaced in a predetermined variable relationship with respect to each other and the side walls of the container, for flow of a heat exchange fluid through said heat transfer devices, and a screen positioned in a substantially horizontal position in said container, said screen being arranged in a spaced position above the bottom of the container.

2. The storage device of claim 1, wherein the housing has front and rear walls, top and bottom walls, and opposed side walls, said heat transfer devices each having a plate-like shape with an internal passageway for flow therethrough of said heat exchange fluid, an inlet conduit for said heat exchange fluid extending through one of said walls of said container and connected to an inlet of said passageway in a first of said series of heat transfer devices, an outlet conduit for said heat exchange fluid extending through one of said walls of said container and connected to an outlet of said passageway in the last of said series of heat transfer devices, and connecting conduits for serially connecting the passageways of said heat transfer devices to each other, and wherein the first of said series of heat transfer devices is spaced from its adjacent container wall and from a succeeding heat transfer device in said series by a distance which is greater than the distances of the intermediate heat transfer devices from each other and which is also greater than the distance of the last heat transfer device from its adjacent container wall and from a preceding heat transfer device of said series.

3. The storage device of claim 1 or 2, including a plurality of said screens in said container, said screens being positioned in a spaced relationship with respect to each other and to the bottom of the container, each said screen having a mesh size of from about 2.83 mm to about 12.7 mm.

4. The storage device of claim 1 or 2, including a plurality of said screens in said container, said screens being positioned in a spaced relationship with respect to each other and to the bottom of the container, each said screen comprising a metal sheet having a plurality of openings of a diameter of from about 3 mm to about 12.5 mm, and wherein the percent open area is from 50 to 75 percent of the total area of said sheet.

5. The storage device of claim 1, wherein said container is constructed of a material selected from metals, metal alloys, synthetic resinous materials, metal/plastic/metal laminates, cementitious materials, plastic or metal lined cementitious materials, fiber reinforced synthetic resinous materials, and reinforced cementitious materials, and said container is hermetically sealed to prevent the loss of water vapor from the phase change material and has a size for storage of said phase change material in an amount of greater than 100 gallons.

6. A storage device comprising a container having a top wall, a bottom wall, and opposed side walls, a hydrated phase change material contained within the container wherein said phase change material passes through repeated cycles of melting and freezing during which the phase change material absorbs and releases latent heat energy, a plurality of heat transfer devices positioned in said container in a substantially vertical orientation, each heat transfer device having a plate-like shape with an internal passageway for flow therethrough of said heat exchange fluid, an inlet conduit for said heat exchange fluid connected to an inlet of said passageway in a first of said series of heat transfer devices, an outlet conduit for said heat exchange fluid connected to an outlet of said passageway in the last of said series of heat transfer devices, and connecting conduits for serially connecting the passageways of the heat transfer devices to each other, and wherein the first heat transfer device is spaced from its adjacent container wall and from a succeeding heat transfer device in said series by a distance which is greater than the distances of the intermediate heat transfer device from each other and which is also greater than the distance of the last heat transfer device from its adjacent container wall and from a preceding heat transfer device of said series, and a screen positioned in said container in a substantially horizontal position above the bottom wall of the container and adjacent to the heat transfer device for supporting solid crystalline particles of the phase change material which are present during the melting cycle of the phase change material.

7. The storage device of claim 6, including a plurality of said screens in said container, said screens being positioned in a spaced relationship with respect to each other and to the bottom of the container, each said screen having a mesh size of from about 2.83 mm to about 12.7 mm.

8. The storage device of claim 6 including a plurality of said screens in said container, said screens being positioned in a spaced relationship with respect to each other and to the bottom of the container, each said screen comprising a metal sheet having a plurality of openings of a diameter of from about 3 mm to about 12.5 mm, and wherein the percent open area is from 50 to 75 percent of the total area of said sheet.

9. The storage device of claim 6, wherein said container is constructed of a material selected from metals, metal alloys, synthetic resinous materials, metal/plastic/metal laminates, cementitious materials, plastic or metal lined cementitious materials, fiber reinforced synthetic resinous materials, and reinforced cementitious materials, and said container is hermetically sealed to prevent the loss of water vapor from the phase change material, and has a size for storage of said phase change material in an amount of greater than 100 gallons.

10. The storage device of claim 6, wherein each said heat transfer device is constructed of at least a pair of bonded metal plates having a passageway formed therebetween for flow of the heat exchange fluid from an inlet opening of said passageway to an outlet opening of said passageway.

11. A method of storing energy in a container containing a hydrated phase change material, comprising the steps of positioning a plurality of generally planar heat transfer devices in a substantially vertical and submerged position into said phase change material in said container, such that a first of said series of heat transfer devices is more widely spaced from an adjacent side wall of said container and from an adjacent intermediate heat transfer device than the spacing of a last of said series of heat transfer devices from an adjacent side wall of said container and said adjacent intermediate heat transfer devices, positioning at least one screen in said container in a substantially horizontal and spaced position above a bottom wall of the container and adjacent to the heat transfer devices, hermetically sealing said container, and flowing a heat exchange fluid serially through said heat transfer devices for melting or freezing said phase change material and for absorbing and releasing latent heat energy from said phase change material.

12. The method of claim 11, including the step of positioning a plurality of said screens in said container in a spaced relation to each other and to the bottom wall of the container.

* * * * *